Patented Aug. 8, 1950

2,517,734

UNITED STATES PATENT OFFICE 2,517,734

METHOD OF KEEPING HOT PROPYLENE GLYCOL NONCORROSIVE TO METALS

Frank Carter Taylor, Jr., Ann Arbor, Mich., assignor to The Dow Chemical Company, Midland, Mich., a corporation of Delaware No Drawing. Application April 30, 1948,
Serial No. 24,437

5 Claims. (Cl. 260—632.5)

This invention relates to a method for the maintenance of propylene glycol in a condition which is non-corrosive to metals.

Propylene glycol is useful for a variety of purposes. Thus, it has found utility as a heat transfer medium at temperatures both below and above its atmospheric boiling point, i. e. both in liquid and in vapor phase. For many other uses it is necessary that the propylene glycol be heated to temperatures approaching or exceeding its normal boiling point. It has been found that, when propylene glycol is heated to temperatures above 100° C., whether in surface contact with air or other oxygen containing gas, or in a vacuum, or in the presence of an inert gas such as nitrogen, the glycol undergoes decomposition to an extent which increases directly with the temperature to which the glycol is exposed and the duration of such exposure. When heating is prolonged in the presence of the primary decomposition products (of unknown composition), there are formed non-volatile secondary decomposition products which often contribute undesired color to the normally colorless glycol. Before such heat-induced primary decomposition occurs, the propylene glycol is no more corrosive of iron or tin than is water, but a propylene glycol containing these decomposition products becomes more and more corrosive with respect to each of these and other common metals. The problem is aggravated because it has been found impossible to effect a practical separation and purification of propylene glycol from all of its corrosive thermally induced decomposition products by a process of simple distillation, either at atmospheric pressure or at reduced pressure.

It is the principal object of the present invention to provide a method for maintaining propylene glycol in a condition non-corrosive to metals. A related object is to provide a method whereby primary decomposition products, resulting from exposure of propylene glycol to temperatures above 100° C., may be prevented from accumulating and from being converted to non-volatile corrosive substances. A further object is to provide a simple method, easily applied to industrial processes employing hot propylene glycol, whereby the glycol may be prevented from becoming more corrosive to iron than is water. Another object is to provide a method as aforesaid which avoids the use of inhibitors or other solid or liquid foreign substances as modifiers of the glycol.

For purposes of comparison, the following corrosion test is adopted as a standard procedure: a clean strip of low carbon steel (black iron), or other metal to be tested, measuring about 0.5 inch wide by about 2.5 inches long, freshly buffed with a wire brush, is immersed for half its length in the suspected corrosive liquid in a glass flask under a reflux condenser, and the liquid and metal are heated at the indicated temperature for several days. The metal strip is dried, cleaned and weighed periodically to determine the rate of loss in weight, which is then computed as milligrams loss per square inch exposed metal area per day. In this test, water at its boiling point causes a loss in low carbon steel of the order of 1.5 milligrams per square inch per day. A corrosion rate of this order is not intolerable, and it is the object of the present invention to treat propylene glycol so that, in contact with iron, it will not corrode the iron at any greater rate than 1.5 milligrams per square inch per day over a period of several days. The treatment should reduce or prevent correspondingly the corrosion of such other metals as tin by hot propylene glycol.

It has now been found that, after propylene glycol has been subjected to temperatures above 100° C., and has undergone initial decomposition, but before decomposition has progressed to the point of marked discoloration, a simple treatment may be given the glycol at a temperature above 100° C., and preferably from 120° C. to the boiling point of the liquid, to maintain the propylene glycol in a satisfactory non-corrosive condition. The treatment consists in bringing the hot liquid glycol into intimate mixture with air or other oxygen-containing gas which is non-injurious to the glycol. In its simplest form, the method involves bubbling air through the hot liquid glycol. A practical variation employs an air lift to transfer the glycol from a point of thermal decomposition to a storage vessel or to a point of use, and the intimate mixture with air during such transfer maintains the glycol in a satisfactory non-corrosive condition. These and other variations of the treatment of the hot liquid glycol with air or oxygen will be referred to hereinafter for convenience as "aeration."

As previously stated, the identity of the thermally induced primary decomposition products of propylene glycol is not known. Whatever their character may be, it has been found that aeration of the hot liquid glycol containing them results in the formation of acetaldehyde and formaldehyde, and possibly other volatile materials, which are removed from the liquid by the combined effects of heat and aeration before they or their precursors can polymerize or be converted otherwise to non-volatile, discoloring corrosive impurities. The apparatus used should preferably have a reflux condenser, or equivalent, to trap and return air-borne glycol and to permit escape of the aldehydes or similar volatile materials.

In industrial heat transfer operations using propylene glycol, the latter may be maintained in the non-corrosive condition by withdrawing the hot glycol from the field of use, aerating the liquid at a temperature above 100° C., and preferably at or near the use temperature, and returning the aerated liquid to the point of use. In continuous operations, the liquid glycol should be withdrawn, aerated and returned to the working zone at a rate such that all of the glycol is aerated before a corrosive condition can be created due to prolonged exposure to heat in the working zone.

The method of the present invention may be used for the treatment of propylene glycol which has been subjected to high temperatures during distillation. Thus, in the fractional distillation of propylene glycol from the concurrently produced di- and tri-propylene glycols at the point of its manufacture, the glycol is subjected for a brief but variable period in the still and column to temperatures ranging up to 189° C. or higher. Such exposure produces some of the primary decomposition products which become progressively more corrosive whenever the liquid glycol is reheated. Aeration of the fresh distillate, however, after suitable warming to a temperature above 100° C., keeps the glycol in a non-corrosive condition.

It has been found that the corrosive factors are not produced as rapidly in propylene glycol containing from about 3 to 8 per cent of water as they are in anhydrous glycol or in that which is more highly diluted. Such preferred glycol-water mixtures are treated somewhat more advantageously by aeration than is the anhydrous glycol.

To illustrate the effect of exposing liquid propylene glycol to prolonged heating, several samples of a pharmaceutical grade of the glycol were subjected to temperatures ranging from 121° to 260° C. (250°–500° F.) for two hours in jacketed glass flasks under reflux condensers. The exposure temperature was taken in each case as that of the heating fluid circulated through the jacket of the flask. After two hours, the propylene glycol was put into contact with freshly cleaned and weighed strips of low carbon steel, and a corrosion test was conducted at 127° C. (260° F.). The extent of corrosion was determined on strips of the steel withdrawn, cleaned and weighed each two days. The results are given in Table 1.

*Table 1*

| Preheating Temperature, °F. | Appearance of Glycol After Heating | Corrosion Rate, mg./sq. in./day | | | | |
|---|---|---|---|---|---|---|
| | | 0-2 days | 2-4 days | 4-6 days | 6-8 days | 8-10 days |
| Not preheated. | Colorless | 1.38 | 2.10 | 2.70 | 4.38 | 6.26 |
| 250 | do | 1.32 | 1.86 | 8.92 | | |
| 274 | V. slightly yellow | 3.06 | 10.28 | 15.34 | | |
| 347 | Slightly yellow | 3.80 | 9.62 | 15.02 | | |
| 402 | Yellow | 7.38 | 7.86 | 12.20 | | |
| 495 | Darker yellow | 5.58 | 6.42 | 9.52 | | |

In the foregoing and following tables, a reported corrosion rate for "0–2 days" is the average daily loss in weight for the first two days of the test, and the reported rate for "6–8 days," for example, is the average daily loss in weight for the period from the end of the sixth to the end of the eighth day.

Minor inconsistencies in results are believed due to variations in heating surface temperatures during the corrosion tests. Despite such variations, it is apparent that propylene glycol which has not been preheated is initially non-corrosive but that, during the corrosion test at 260° F. it becomes corrosive. It is also clear that an exposure of 2 hours to the reported temperatures tends to accelerate the corrosive action of the glycol on mild steel. Any heat treatment which results in discoloration of the propylene glycol converts the glycol to a commercially objectionable corrosive product.

The data in Table 2 illustrate the ineffectiveness of fractional distillation as a means of reconverting a corrosive propylene glycol to the non-corrosive condition.

*Table 2*

| | Material Tested | Corrosion of Iron, mg./sq. in./day, at 260° F. | | | |
|---|---|---|---|---|---|
| | | 0-2 days | 2-4 days | 4-6 days | 6-8 days |
| 1 | Unused glycol | 0.28 | 0.42 | 2.42 | |
| 2 | Glycol used, 30 hours at 260° F | 11.5 | 14.0 | 13.5 | 18.5 |
| 3 | Glycol used, 45 hours at 260° F | 12.9 | 18.7 | | 21.8 |
| 4 | Center cut distillate from decomposed glycol | 9.3 | 10.7 | | 13.6 |
| 5 | do | 7.8 | 9.1 | 11.4 | |

The distilled propylene glycol is slightly less corrosive than the material fed to the still, but is far too corrosive for continued use in contact with iron.

The desirability of having a small amount, preferably from 3 to 8 per cent, of water in a propylene glycol which is to be exposed to elevated temperatures is illustrated by the reduced corrosion rates, both on iron and on tin, obtained with such mixtures. Typical results, based on a series of tests, all using propylene glycol with the same past history, are given in Table 3.

*Table 3*

| Per Cent Water | Metal | Corrosion, mg./sq. in./day, at 260° F. | |
|---|---|---|---|
| | | 0-2 days | 2-4 days |
| 0 | Tin | 14.9 | 21.6 |
| 2.5 | do | 6.5 | 9.6 |
| 5.0 | do | 2.4 | 3.0 |
| 2.5 | Iron | 1.44 | 4.5 |
| 5.0 | do | 0.18 | 0.2 |
| 7.5 | do | 0.28 | 0.26 |
| 10 | do | 0.62 | 2.46 |
| 15 | do | 0.82 | 1.56 |

The aeration procedure of the present invention is effective in maintaining propylene glycol in a non-corrosive condition, even when the glycol is heated for prolonged periods, if the aeration is continuous, or is applied at frequent intervals such that the glycol does not have an opportunity to accumulate corrosive decomposition products. This is illustrated in Table 4, which sets forth a series of tests conducted on propylene glycol under various conditions of aeration at 121°–127° C. (250°–260° F.). The tests were conducted in the presence of metal, and the corrosion rates during the tests were noted.

*Table 4*

| Description of Test | Amount of Water in Glycol | Metal | Corrosion Rate, mg./sq. in/day | | | | |
|---|---|---|---|---|---|---|---|
| | | | 0-2 days | 2-4 days | 4-6 days | 6-8 days | 14-16 days |
| 1. Air bubbled thru liquid | *Per cent* None | Iron | 0.09 | | 0.49 | 0.47 | |
| 2. ...do... | 5 | ...do... | 0.34 | 0.32 | 0.36 | 0.18 | 0.26 |
| 3. ...do... | 5 | ...do... | 0.47 | 0.49 | 0.14 | 0.04 | |
| 4. ...do... | 5 | Tin | 0.76 | 1.16 | 0.32 | | |
| 5. Air passed thru vapor | 5 | Iron | 2.18 | 3.94 | 6.03 | 5.35 | |
| 6. Nitrogen bubbled thru liquid | 5 | ...do... | 2.74 | 4.83 | | | |
| 7. Glycol kept in motion by air lift. | 1 | ...do... | 0.48 | 0.10 | 0.11 | 0.11 | |

From Table 4 it is seen that a satisfactory non-corrosive condition is maintained in hot liquid propylene glycol by aeration of the liquid, but that nitrogen is ineffective for the purpose when employed in the same manner. Blowing air through the vapor over the hot liquid does not accomplish the desired result. The intimate contact between air and liquid in an air-lift system is particularly effective in keeping the propylene glycol non-corrosive.

In another series of tests, propylene glycol samples with different histories of thermal exposure were aerated at 127° C. (260° F.) while in contact with iron strips used to measure the corrosion rate. The first glycol sample was fresh from the factory, and had never been heated except during the distillation step at the end of its process of manufacture. This was refractionated in a glass still, and the center cut was taken as the second test sample. The third sample was the center cut of a similarly refractionated glycol which had been heated previously in use for several days as a heat transfer fluid at a temperature near 127° C. in iron equipment and in contact with tin cans, and which had thereby become dark colored and highly corrosive. The corrosive properties of these liquids, with and without aeration, are given in Table 5. All corrosion tests were run on iron, in the presence of 5 per cent water.

*Table 5*

| Propylene Glycol Sample No. | Aeration | Corrosion Rate, mg./sq. in/day | | | |
|---|---|---|---|---|---|
| | | 0-2 days | 2-4 days | 4-6 days | 6-8 days |
| 1 | No | 0.44 | 2.54 | 14.6 | 16.4 |
| 1 | Yes | 0.34 | 0.32 | 0.36 | 0.18 |
| 2 | No | 2.96 | 6.88 | 18.1 | 13.4 |
| 2 | Yes | 0.18 | 0.10 | 0.02 | 0.04 |
| 3 | No | 22.1 | | | |
| 3 | Yes | 0.16 | 0.16 | | |

It is apparent that the present aeration process is effective regardless of the past thermal history of the propylene glycol, if the glycol is first freed from polymerized decomposition products or other high boiling or non-volatile impurities. Other tests have shown that filtration to remove insoluble matter including tar-like polymers, decolorization by active charcoal, and treatment of decomposed and corrosive glycol with anion exchange agents are all ineffective to reduce the corrosiveness of a thermally decomposed product such as that represented by sample No. 3 in Table 5, above.

The following example illustrates the utility of the invention:

In a canning operation, whole kernels of green corn (maize) are packed in tins and sealed in the usual manner. The tins are conveyed at atmospheric pressure through a zone in which they are exposed to a spray of hot liquid propylene glycol at 127° C. (260° F.). The cans are conveyed out of the spray zone, for a time to permit evaporation of the glycol from the cans, and are then chilled in a water bath. A charge of 400 gallons of glycol is kept in constant circulation at a rate of about 200 gallons per minute from a sump, where its temperature is between 113° and 122° C. (235°–252° F.), through a reheater in which its temperature is boosted to 127° C., and thence through the spray zone from which it falls again to the sump. The canned product is thoroughly sterilized by this treatment. When no aeration of the glycol occurs in the described cycle, the glycol changes gradually in appearance, odor and corrosiveness (see Table 2, above), and finally becomes so corrosive as to detin some of the cans, even in a short exposure period. Distillation, filtration and clarification procedures improve the appearance and, to some extent, the odor of the propylene glycol, but do not render it non-corrosive, nor can such procedures maintain an initially non-corrosive glycol in a satisfactorily non-corrosive condition. When, however, a non-corrosive propylene glycol is used to fill the equipment, and the hot liquid is aerated continuously either in the sump, or in the supply header over the spray zone, or by the use of an air lift to effect transfer of the propylene glycol from the sump to the spray header, a non-corrosive condition is maintained in the glycol and corrosion of the equipment, detinning of the cans, and discoloration of the glycol with accompanying development of odor are all eliminated. Corrosion tests on the aerated liquid glycol give data similar to those in runs 1–4 and 7 of Table 4, above.

The process of the present invention is particularly desirable for use with a propylene glycol which is to be used in the processing of foodstuffs or as a constituent of pharmaceutical preparations, since no corrosion inhibitor or other foreign matter need be added to the glycol to accomplish the desired result. It is apparent, however, that the invention is not limited in its applicability to propylene glycol for use in the above-suggested fields. It is limited only to the aeration treatment of liquid propylene glycol at a temperature above 100° C. for the maintenance therein of a non-corrosive condition.

I claim:

1. The method which comprises mixing a stream of air intimately with a non-corrosive liquid propylene glycol in which the amount of any water present does not exceed 15 per cent while the glycol is at a temperature above 100° C., to maintain the non-corrosive condition therein at least as long as such aeration continues.

2. The method which comprises bubbling a stream of air continuously through a non-corrosive liquid propylene glycol containing from 3 to 8 per cent of water, while the liquid is at a temperature above 100° C., to maintain the non-corrosive condition therein at least as long as such aeration continues.

3. The method which comprises bubbling a stream of air continuously through a non-corrosive liquid propylene glycol in which the amount of any water present does not exceed 15 per cent while the glycol is at a temperature between 120° C. and the boiling point of the liquid, to maintain the non-corrosive condition therein at least as long as such aeration continues.

4. The method which comprises bubbling a stream of air continuously through a non-corrosive liquid propylene glycol containing from 3 to 8 per cent of water, while the liquid is at a temperature between 120° C. and the boiling point of the liquid, to maintain the non-corrosive condition therein at least as long as such aeration continues.

5. In a method in which a non-corrosive propylene glycol is employed as a heat transfer medium at a temperature above 100° C., the step which comprises subjecting the propylene glycol in the liquid phase and at a temperature above 100° C. to an air lift operation at a rate such that all of the glycol employed is so-aerated before thermally induced decomposition makes the glycol corrosive, to maintain the said glycol in the non-corrosive condition.

FRANK CARTER TAYLOR, Jr.

REFERENCES CITED

The following references are of record in the file of this patent:

UNITED STATES PATENTS

| Number | Name | Date |
|---|---|---|
| 2,173,689 | Lamprey | Sept. 19, 1939 |